United States Patent
Fessler

(10) Patent No.: US 6,537,176 B2
(45) Date of Patent: Mar. 25, 2003

(54) ARRANGEMENT FOR OPERATING AN AUTOMOTIVE CVT

(75) Inventor: Bernd Fessler, Kressbronn (DE)

(73) Assignee: ZF Batavia L.L.C., Batavia, OH (US)

( * ) Notice: Subject to any disclaimer, the term of this patent is extended or adjusted under 35 U.S.C. 154(b) by 0 days.

(21) Appl. No.: 09/819,519

(22) Filed: Mar. 27, 2001

(65) Prior Publication Data

US 2001/0039470 A1 Nov. 8, 2001

(30) Foreign Application Priority Data

Apr. 7, 2000  (DE) .......................................... 100 17 402

(51) Int. Cl.$^7$ ............................................... F16H 59/06
(52) U.S. Cl. ........................................... 477/45; 474/28
(58) Field of Search .............................. 474/28, 18, 70; 477/44, 45, 46, 48

(56) References Cited

U.S. PATENT DOCUMENTS

| | | | | |
|---|---|---|---|---|
| 4,798,561 A | * | 1/1989 | Hattori et al. | 474/18 |
| 4,854,920 A | * | 8/1989 | Mimura | 474/28 |
| 5,259,272 A | * | 11/1993 | Yamamoto et al. | 477/45 |
| 5,766,105 A | * | 6/1998 | Fellows et al. | 474/17 |
| 5,888,168 A | * | 3/1999 | Niiyama et al. | 474/28 |
| 5,961,408 A | * | 10/1999 | Konig et al. | 474/18 |
| 6,099,424 A | * | 8/2000 | Tsai et al. | 474/12 |
| 6,126,138 A | * | 10/2000 | Tsai | 251/33 |
| 6,174,254 B1 | * | 1/2001 | Tsai | 474/28 |
| 6,224,509 B1 | * | 5/2001 | Gierling | 474/28 |
| 6,299,564 B1 | * | 10/2001 | Gessler et al. | 474/28 |

FOREIGN PATENT DOCUMENTS

| | | | |
|---|---|---|---|
| DE | 195 33 976 A1 | 3/1997 | |
| EP | 0 841 504 A2 | 5/1998 | ........... F16H/61/00 |

* cited by examiner

Primary Examiner—Christopher P. Schwartz
Assistant Examiner—Devon Kramer
(74) Attorney, Agent, or Firm—Davis & Bujold, P.L.L.C.

(57) ABSTRACT

An arrangement for operating a CVT transmission of a motor vehicle is proposed which comprises a hydraulic circuit supplied from a hydraulic pressure source (8) having two parallel second branches (16, 17) attached to the first branch (9) of the hydraulic circuit each for supplying pressure to a hydraulic actuator (4, 5) for respectively a cone pulley pair (2, 3) of the transmission wherein with the first branch (9) and each second branch (16, 18) an independently controllable pressure valve system (12, 13, 18, 19, 20, 21) is associated for adjusting the hydraulic pressure in the respective branch (9, 16, 17). According to the invention at least one of the pressure valve systems (18, 19, 20, 21) associated with the second branches (16, 17) has a controllable pressure-differential valve (18, 19) connected between the first branch (9) and the second branch (16, 17) concerned. At the same time the control unit (15) is designed for the purpose of optionally working in a first pressure control mode in which it adjusts the pressure in the second branch (16, 17) attached to the pressure-differential valve (18, 19) by control of the pressure valve system (12, 13) associated with the second branch (9) without control of the pressure-differential valve (18, 19), or in a second pressure control mode in which it adjusts this pressure by control of the pressure-differential valve (18, 19) at will under simultaneously control of the pressure valve system (12, 13) associated with the first branch (9).

14 Claims, 1 Drawing Sheet

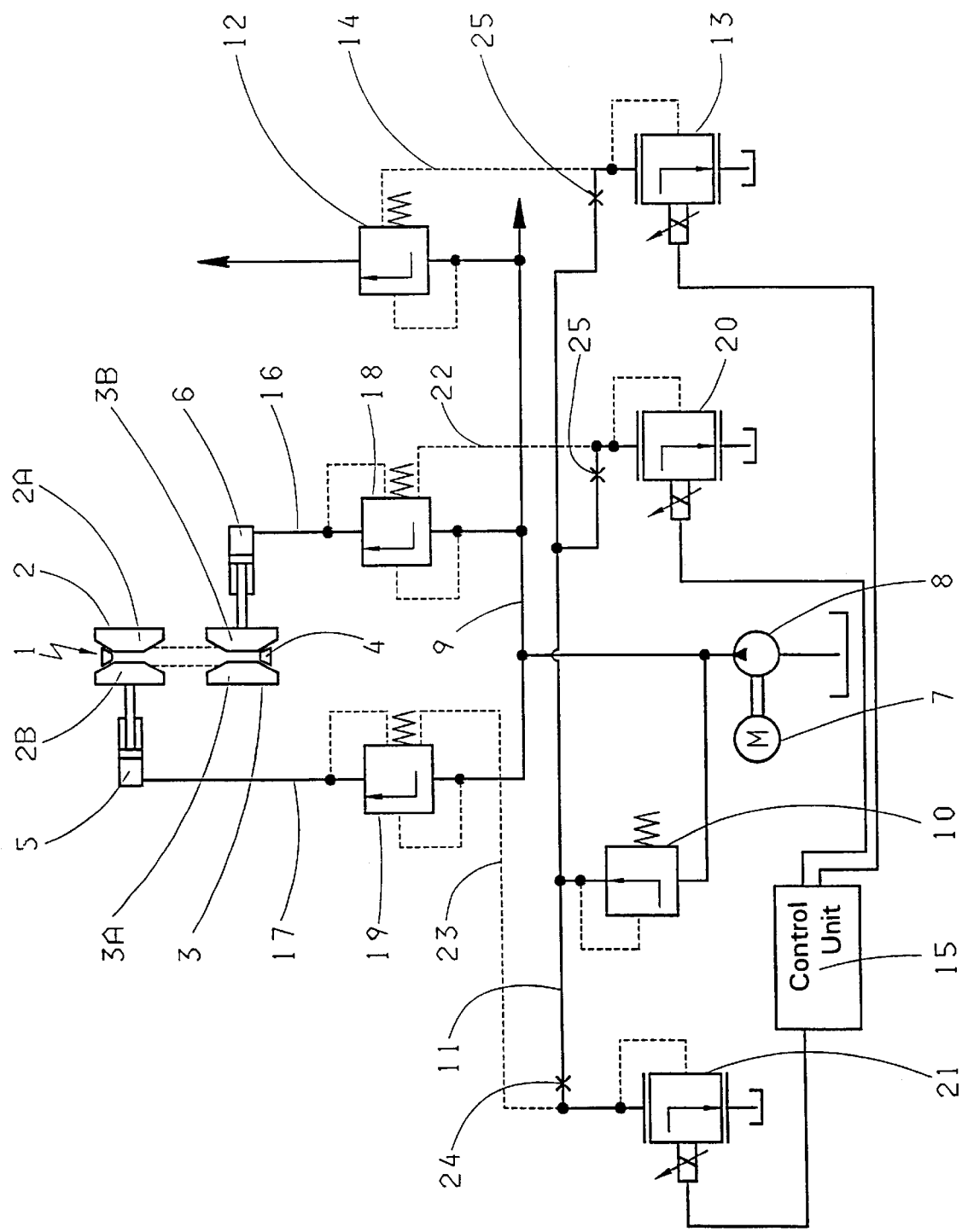

ARRANGEMENT FOR OPERATING AN AUTOMOTIVE CVT

The invention concerns an arrangement for operating a continuously variable transmission for a motor vehicle, in particular a CVT automatic transmission, having a primary pulley pair axially adjustable relative to each other, a secondary pulley pair axially adjustable relative to each other and a flexible power-transmitting element wound around the two, comprising a hydraulic circuit supplied by a hydraulic pressure source having attached to a first branch of the hydraulic circuit, two parallel second branches, each supplying pressure to a hydraulic actuator of a separate one of the pulley pairs wherein with the first branch and with each second branch is associated one pressure valve system independently controllable by a control unit for adjusting the hydraulic pressure in the relevant branch.

Such an operating arrangement is known, e.g. from DE 195 33 976. In the known solution, a controllable pressure-reducing valve is connected between each of the second branches and the first branch of the hydraulic circuit. The pressure in the first branch is adjustable by means of a controllable pressure-limiting valve. The two pressure-reducing valves and the pressure-limiting valve are each controllable by means of an electromagnetically operable proportional pressure-regulating valve. The pressure requirement on the hydraulic actuators for both pulley pairs, which changes according to the operating mode of the vehicle, is always met by an adjustment adapted to the momentary requirement of the output-side pressure level of the pressure-reducing valves by means of the appertaining proportional pressure-regulating valves. The pressure in the first branch, that is, the system pressure, is maintained by control of the pressure-limiting valve always above the respective high pressure existing in both second branches by an adjustable pressure offset.

The problem to be solved by this invention is to make available an arrangement for operating a CVT transmission of a motor vehicle, in particular a CVT automatic transmission, which compared to the cited prior art is improved with regard to the dynamic behavior of the hydraulic system and to the tendency to leakage and vibrations of the whole hydraulic circuit.

For the purpose the invention provides that at least one of the pressure-reducing valve systems associated with the second branches comprises a controllable pressure-differential valve connected between the first branch and the second branch concerned, and that the control unit be designed so as optionally to adjust in a first pressure-control mode in which it adjusts the pressure in the second branch attached to the pressure-differential valve by control of the pressure valve system associated with the first branch without control of the pressure-differential valve, or to work in a second pressure control mode in which it adjusts the pressure by control of the pressure-differential valve—if desired under simultaneous control of the pressure valve arrangement associated with the first branch.

In the inventive solution, in the first pressure control mode, the pressure in the second branch attached to the pressure-differential valve is coupled with the pressure in the first branch. If the pressure in the first branch is changed, the pressure in the second branch concerned follows maintaining a steady pressure difference with the pressure in the first branch.

It has been shown that by the direct coupling of the pressure in the second branch concerned with the pressure in the first branch, a clear reduction of vibration of the whole hydraulic circuit can be achieved. Also quicker response times are possible in the operation of the hydraulic actuator supplied from the second branch concerned and therewith a better dynamic behavior.

In current CVT transmissions or CVT automatic transmissions, because of constructional and geometric conditions, the contact pressure of one of the pulley pairs must often be adjusted, over a very large range of driving modes of the vehicle, higher than the contact pressure of the other pulley pair. This situation can be used to allow the control unit work during comparatively long operating phases in the first pressure control mode with the result of a super-dynamic and very poor vibration operation of the transmission.

In many current continuously variable transmission, only during relatively short or/and rare operation phases must the contact pressure of the other pulley pair be raised above that of one pulley pair. For these operation phases, the control unit can change to the second pressure control mode in which it can adjust the pressure in the second branch attaching to the pressure-differential valve independently of the pressure adjustment of the first branch.

In the practice it is often the secondary pulley pair whose actuator during many operation phases must be supplied with higher pressure than the actuator of the primary pulley pair. Then at least the pressure valve system of the second branch associated with the secondary pulley pair conveniently comprises a controllable pressure-differential valve. In particular each pressure valve system associated with one of the second branches can comprise a controllable pressure-differential valve so that both the actuator of the primary pulley pair and the actuator of the secondary pulley air—at the same time or at different times—be supplied with a pressure coupled with the pressure of the first branch.

According to a preferred development, the pressure-differential valve can be controlled by an electromagnetically actuatable proportional pressure valve wherein the control unit is designed so as to operate in the first pressure control mode the proportional pressure valve in an end position in which the pressure is minimal in one control line leading from the proportional pressure valve to the pressure-differential valve.

In this manner can be extensively reduced, if not eliminated, in the first pressure control mode, leakage losses of the proportional pressure valve which can be considerable in the pressure-regulating range of the valve.

So essential improvements in efficiency can be obtained specially when the first pressure control mode, compared to the second pressure mode, is the temporarily predominant manner of operation of the control unit.

Other advantages and advantageous developments of the invention result form the claims and the embodiment fundamentally described herebelow with reference to the drawing.

BRIEF DESCRIPTION OF THE DRAWING

The single FIGURE of the drawing shows a simplified hydraulic circuit diagram of an inventive operating arrangement for a variator of a CVT automatic transmission.

In the drawing a variator 1 has a primary cone pulley pair 2, a secondary cone pulley pair 3 and a power-transmitting element 4 such as a pushing linked band rotating between the two pulley pairs 2, 3. In a manner not shown in detail, the primary cone pulley pair 2 is actuatable by an input drive assembly, usually an internal combustion engine, and is connected therewith, e.g. via a hydrodynamic torque converter and a lock-up clutch connected in parallel. In a manner likewise not shown in detail, the secondary cone pulley pair 3 delivers the changed power of the input drive assembly via a differential transmission to driven wheels of the motor vehicle. Each cone pulley pair 2, 3 has a cone pulley pair 2A, 3A axially stationary relative to its axis of rotation and a cone pulley pair 2B, 3B adjustable relative thereto by means of a hydraulic actuator, respectively 5 and 6. The hydraulic actuator 5, 6 is here diagrammatically shown as separate piston-cylinder unit. In practice, the movable cone pulley 2B, 3B of the respective cone pulley pair 2, 3, as a rule, will be integral part of the piston-cylinder unit. By adjusting the movable pulleys, the running radius of the belt drive element 14 can be continuously changed on the cone pulley pairs 2, 3 and therewith the ratio of the transmission.

To adjust the movable cone pulleys 2B, 3B of the cone pulley pairs 2, 3 a hydraulic circuit is provided with a hydraulic pump 8, representing a hydraulic pressure source and driven by an electromotor branch 7, which delivers the pressure oil current it conveys to a first branch or main branch 9 and via a pressure-reducing valve 10 to a control branch 11.

A controllable pressure-limiting valve 12 limits the pressure in the main branch 9 to an adjustable value. The oil current flowing from the pressure-limiting valve 12 can be fed, e.g. to the previously actuated hydrodynamic torque converter or lubrication points of the transmission.

To adjust the pressure in the main branch 9 is an electromagnetically operable proportional pressure-regulating valve 13 that is supplied from the control branch 11 and on a control line 14 delivers a control pressure to the pressure-limiting valve 12.

The proportional magnet of the pressure-regulating valve 13 can be controlled from an electronic control unit 15 according to the pressure needed in the main branch 9, the pressure-reducing valve 10 adjusts the pressure in the control branch 11 to a constant value of a few bars.

The main branch 9 bifurcates in second branches or secondary branches which lead to the hydraulic consumers of the hydraulic circuit. Two of those secondary branches, designated with 16 and 17 respectively, lead to the hydraulic actuators 5 and 6. Even though not further shown, it is understood that other secondary branches can be provided which lead to other consumers such as a planetary set. The secondary branches 16, 17 are attached to the main branch 9 via respective controllable pressure-differential valves 18 and 19.

Each pressure-differential valve 18,19 produces an adjustable pressure difference between the pressures in the main branch 9 and in the respective secondary branches 16, 17. To adjust the pressure difference, with each pressure-differential valve 18, 19 is associated one electromagnetically actuatable proportional pressure-regulating valve 20 or 21 whose proportional magnet in turn can be controlled by the control unit 15. The pressure-regulating valves 20, 21 are also supplied from the control branch 11 and deliver over the control lines 22, 23 a control pressure to the respective pressure-differential valve 18 or 19. The magnitude of this control pressure determines the pressure difference which appears on the respective pressure-differential valve 18 or 19.

The pressure-regulating valves 13, 20, 21 are each coupled via an aperture 24, 25 of constant through-flow cross section with the control branch 11 in order to keep low, in the regulating range of the pressure-regulating valve 13, 20, 21, the pressures prevailing in the control lines 14, 22, 23 and thus the leakage losses in the pressure-regulating valves 13, 20, 21.

By providing the controllable pressure-differential valves 18,19 it becomes possible to modulate in two manners the oil pressure in the secondary branches 16, 17 and thus the contact pressure of the cone pulley pairs 2, 3. In one manner it is possible, without change of the control pressure of the pressure-differential valves 18, 19 to change the pressure in the main branch 9 by the control pressure of the pressure-limiting valve 13 being changed by actuation of the pressure-regulating valve 13.

The pressure level change of the main branch 9 then leads, with an unchanged pressure drop on the pressure-differential valves 18,19, to a corresponding pressure level change in the secondary branches 16,17. Herebelow this is designated as first pressure control mode of the control unit 15.

In the other manner, by actuating the pressure-regulating valves 20,21, the control pressure of the pressure-differential valves 18, 19 can be changed, which changes the pressure drop in the pressure-differential valves 18, 19. Herebelow this will be called second pressure control mode. In the second pressure control mode the pressure in the main branch 9 can be kept constant, but a modulation of the pressure can also be added in the main branch 9.

By proper design of the power and surface ratios of both cone pulley pairs 2, 3 and of the hydraulic actuators 5 and 6, a broad working range of the transmission can be obtained there always being needed in one of the secondary branches 16, 17 a higher pressure than in the other secondary branch. This makes it possible to operate the control unit 15 in these broad working ranges in the first pressure control mode in which as result of the direct pressure coupling between the main branch 9 and the secondary branch 16 or 17, with respective high pressure need, a very dynamic and low vibration responsive behavior of the hydraulic circuit be obtained.

To keep specially low the leakage losses, in the first pressure control mode the respective high pressure need is adjusted to an end position in which its proportional magnet is not supplied with current and the control pressure is minimal in the respective control lines 22 or 23.

In this end position almost no leakage appears on the pressure-regulating valve concerned 20 or 21. Allowance must be made then only for leakage losses on the pressure-regulating valve 13 which is operated for adjusting to regulating position the pressure in the main branch 9 and on the pressure-regulating valve 20 or 21 which is associated with the secondary branch 16 or 17 with respective low pressure need and in the first pressure control mode will also be in regulating position.

If in another working point of the transmission the pressure in the secondary branch 16 or 17, formerly with a low pressure need, must be raised above the pressure in the secondary branch formerly with a high pressure need, then the control unit 15 changes from the first to the second pressure control mode. At the same time, by simultaneous control of the pressure-regulating valve 13 and of the pressure-regulating valve 20 or 21 associated with the secondary branch 16 or 17 formerly with high pressure need, the control unit can increase the pressure in the main branch without necessarily increasing accordingly the pressure in this secondary branch.

The pressure level of the main branch 9 thus increased can then be used for the secondary branch formerly with low pressure need. Independently of the increased pressure in the main branch 9, the pressure level of the secondary branch formerly with high pressure need can be kept constant or changed by adequate control of its associated pressure-regulating valve 20 or 21.

| Reference numerals | |
|---|---|
| 1 | variator |
| 2 | primary |
| 2A | stationary cone pulley |
| 2B | adjustable cone pulley |
| 3 | secondary cone pulley pair |
| 3A | stationary cone pulley |
| 3B | adjustable cone pulley |
| 4 | belt drive element |
| 5 | hydraulic actuator |
| 6 | hydraulic actuator |
| 7 | electromotor |
| 8 | hydraulic pump |
| 9 | main branch of the hydraulic circuit |
| 10 | pressure-reducing valve |
| 11 | control branch |
| 12 | pressure-limiting valve |
| 13 | pressure-regulating valve |
| 14 | control line |
| 15 | control unit |
| 16 | secondary branch |
| 17 | secondary branch |
| 18 | pressure-differential valve |
| 19 | pressure-differential valve |
| 20 | proportional pressure-regulating valve |
| 21 | proportional pressure-regulating valve |
| 22 | control line |
| 23 | control line |
| 24 | aperture |
| 25 | aperture |

What is claimed is:

1. A system for operating a CVT transmission of a motor vehicle, the system comprising:
   a pair of relatively adjustable pulleys forming a primary pulley pair (2); a pair of relatively adjustable pulleys forming a secondary pulley pair (3); and a flexible power-transmitting element (4) wrapped around the primary and secondary pulley pairs (2, 3);
   a hydraulic pump (8) for supplying pressure to a primary branch (9) of the system, and the primary branch (9) further having a primary controllable pressure-limiting valve (12) and a primary pressure regulating valve (13) connected to the primary controllable pressure-limiting valve (12) for controlling operation of the primary controllable pressure-limiting valve (12);
   a first hydraulic actuator (5) connected to the primary pulley pair (2) and a second hydraulic actuator (6) connected to the secondary pulley pair (3);
   a first secondary branch (16) interconnecting a first pressure differential valve (18) with the first hydraulic actuator (5) and a second secondary branch (17) interconnecting a second pressure differential valve (19) with the second hydraulic actuator (6);
   the first and second pressure differential valves (18 and 19) being supplied with pressure by the primary branch (9);
   a first proportional pressure-regulating valve (20) coupled to the first pressure differential valve (18) and a second proportional pressure-regulating valve (21) coupled to the second pressure differential valve (19); and
   a control unit (15) connected to the primary pressure regulating valve (13) and the first and second pressure regulating valves (20, 21) to control operation thereof.

2. The system according to claim 1, wherein at least the first pressure differential valve (18) and the first pressure-regulating valve (20) of the second branch (16) is associated with the secondary pulley pair (3) and comprises a controllable pressure-differential valve (18).

3. The system according to claim 2, wherein the first and second pressure differential valves (18, 19) and the first and second pressure regulating valves (20, 21) each comprise a controllable pressure-differential valve.

4. The system according to claim 1, wherein the first and second pressure regulating valves (20, 21) are electromagnetically actuatable proportional pressure valves, and the first and second pressure differential valves (18, 19) are respectively controllable by the first and second pressure regulating valves (20, 21).

5. The system according to claim 4, wherein the control unit (15), when operating in a first pressure control mode, moves the first and second pressure regulating valves (20, 21) to an end position in which the pressure in a control line (22, 23), leading from the first and second pressure regulating valves (20, 21) to the first and second pressure differential valves (18, 19), is minimal.

6. The system according to claim 1, wherein the control unit has a first mode of operation and a second mode of operation, the control unit (15), when in the first mode of operation, controls the pressure regulating valve (13) which communicates with the pressure limiting valve (12) to adjust the pressure of the first branch (9), and the pressure adjustment of the first branch alters the pressure of the first and second secondary branches (16, 17), and
   the control unit (15), when in the first mode of operation, communicates with each of the proportional pressure-regulating valves (20, 21) which adjusts the pressure differential valves (18, 19) to adjust the pressure of the first and second secondary branches (16, 17).

7. The system according to claim 6, wherein the first mode and the second mode operate independently of one another.

8. The system according to claim 1, wherein the system further comprises a pressure reducing valve (10) for reducing pressure supplied to a control branch (11) of the system.

9. A system for operating a CVT transmission of a motor vehicle, the system comprising:
   a pair of relatively adjustable pulleys forming a primary pulley pair (2); a pair of relatively adjustable pulleys forming a secondary pulley pair (3); and a flexible power-transmitting element (4) wrapped around the primary and secondary pulley pairs (2, 3);
   a hydraulic pump (8) for supplying pressure to a primary branch (9) of the system and to a control branch (11) of the system, and the primary branch (9) further having a primary controllable pressure-limiting valve (12) and a primary pressure regulating valve (13) connected to the primary controllable pressure-limiting valve (12) for controlling operation of the primary controllable pressure-limiting valve (12), the primary controllable pressure-limiting valve (12) and the primary pressure regulating valve (13) also control a volume of a pressure fluid which reaches a first and second pressure differential valves (18 and 19);
   a first hydraulic actuator (5) connected to the primary pulley pair (2) and a second hydraulic actuator (6) connected to the secondary pulley pair (3);
   a first secondary branch (16) interconnecting the first pressure differential valve (18) with the first hydraulic actuator (5) and a second secondary branch (17) interconnecting the second pressure differential valve (19) with the second hydraulic actuator (6);

the first and second pressure differential valves (18 and 19) being supplied with pressure by the primary branch (9);

a first proportional pressure-regulating valve (20) coupled to the first pressure differential valve (18) and a second proportional pressure-regulating valve (21) coupled to the second pressure differential valve (19);

the control branch (11) having a pressure reducing valve (10) for reducing pressure supplied to the control branch (11), and the control branch supplying reduced pressure to a primary pressure regulating valve (13) and the first and second pressure differential valves (18,19); and a control unit (15) connected to a primary pressure regulating valve (13) and the first and second pressure regulating valves (20, 21) to control operation thereof.

10. The system according to claim 9, wherein the control unit (15), when operating in a first pressure control mode, moves the first and second pressure regulating valves (20, 21) to an end position in which the pressure in a control line (22, 23), leading from the first and second pressure regulating valves (20, 21) to the first and second pressure differential valves (18, 19), is minimal.

11. The system according to claim 9, wherein the control unit has a first mode of operation and a second mode of operation, the control unit (15), when in the first mode of operation, controls the pressure regulating valve (13) which communicates with the pressure limiting valve (12) to adjust the pressure of the first branch (9), and the pressure adjustment of the first branch alters the pressure of the first and second secondary branches (16, 17), and the control unit (15), when in the first mode of operation, communicates with each of the proportional pressure-regulating valves (20, 21) which adjusts the pressure differential valves (18, 19) to adjust the pressure of the first and second secondary branches (16, 17).

12. A system for operating a CVT transmission of a motor vehicle, the system comprising:

a pair of relatively adjustable pulleys forming a primary pulley pair (2); a pair of relatively adjustable pulleys forming a secondary pulley pair (3); and a flexible power-transmitting element (4) wrapped around the primary and secondary pulley pairs (2, 3);

a hydraulic pump (8) for supplying pressure to a primary branch (9) of the system and to a control branch (11) of the system, and the primary branch (9) further having a primary controllable pressure-limiting valve (12) and a primary pressure regulating valve (13) connected to the primary controllable pressure-limiting valve (12) for controlling operation of the primary controllable pressure-limiting valve (12), the primary controllable pressure-limiting valve (12) and the primary pressure regulating valve (13) also control a volume of a pressure fluid which reaches a first and second pressure differential valves (18 and 19);

a first hydraulic actuator (5) connected to the primary pulley pair (2) and a second hydraulic actuator (6) connected to the secondary pulley pair (3);

a first secondary branch (16) interconnecting the first pressure differential valve (18) with the first hydraulic actuator (5) and a second secondary branch (17) interconnecting the second pressure differential valve (19) with the second hydraulic actuator (6);

the first and second pressure differential valves (18 and 19) being supplied with pressure by the primary branch (9);

a first proportional pressure-regulating valve (20) coupled to the first pressure differential valve (18) and a second proportional pressure-regulating valve (21) coupled to the second pressure differential valve (19);

the control branch (11) having a pressure reducing valve (10) for reducing pressure supplied to the control branch (11), and the control branch supplying reduced pressure to each one of the primary pressure regulating valve (13) and the first and second pressure differential valves (18, 19) via respective component of constant through-flow cross sectional area; and a control unit (15) connected to the primary pressure regulating valve (13) and the first and second pressure regulating valves (20, 21) to control operation thereof.

13. The system according to claim 12, wherein the control unit (15), when operating in a first pressure control mode, moves the first and second pressure regulating valves (20, 21) to an end position in which the pressure in a control line (22, 23), leading from the first and second pressure regulating valves (20, 21) to the first and second pressure differential valves (18, 19) is minimal.

14. The system according to claim 12, wherein the control unit has a first mode of operation and a second mode of operation, the control unit (15), when in the first mode of operation, controls the pressure regulating valve (13) which communicates with the pressure limiting valve (12) to adjust the pressure of the first branch (9), and the pressure adjustment of the first branch alters the pressure of the first and second secondary branches (16, 17), and the control unit (15), when in the first mode of operation, communicates with each of the proportional pressure-regulating valves (20, 21) which adjusts the pressure differential valves (18, 19) to adjust the pressure of the first and second secondary branches (16, 17).

* * * * *